United States Patent [19]

Knochel et al.

[11] 4,050,414
[45] Sept. 27, 1977

[54] ANIMAL TOILET

[75] Inventors: Wayne L. Knochel; Robert S. Traeger, both of Rochester, Ind.

[73] Assignee: KLT Industries, Inc., Rochester, Ind.

[21] Appl. No.: 687,161

[22] Filed: May 17, 1976

[51] Int. Cl.$^2$ .............................................. A01K 29/00
[52] U.S. Cl. ...................................................... 119/1
[58] Field of Search ................................ 119/1, 19, 29

[56] References Cited

U.S. PATENT DOCUMENTS 3,793,988  2/1974  Traeger ................................... 119/1
3,842,803  10/1974  Temel ..................................... 119/1

Primary Examiner—Hugh R. Chamblee
Attorney, Agent, or Firm—Oltsch & Knoblock

[57] ABSTRACT

An animal toilet having a frame supported conveyor belt upon which the animal deposits its excreta. One end of the conveyor belt is pivoted to the toilet frame with the opposite end of the belt being supported upon a trip lever which is depressed when the animal steps upon the belt and which after the animal leaves the belt actuates a motor to cause the belt to rotate and to be cleaned.

4 Claims, 8 Drawing Figures

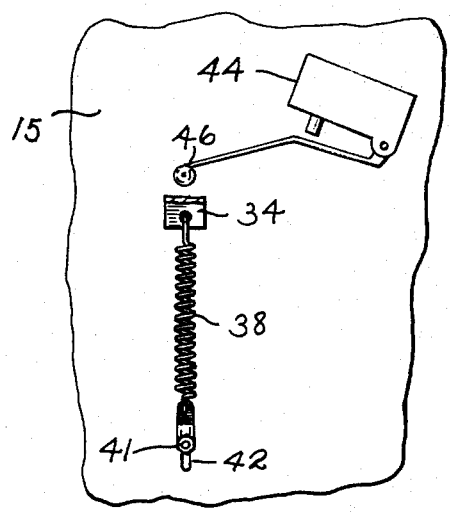
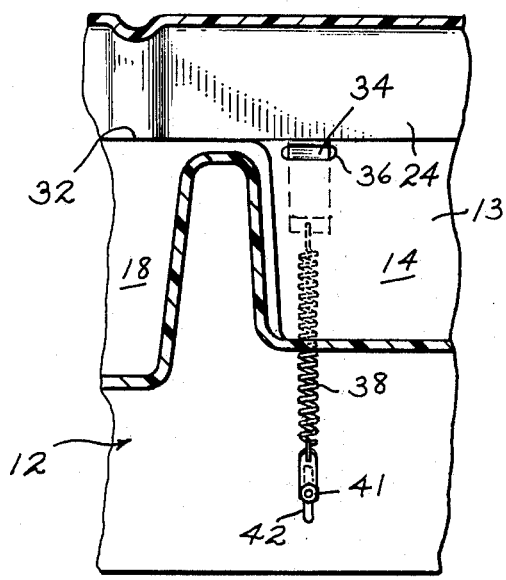
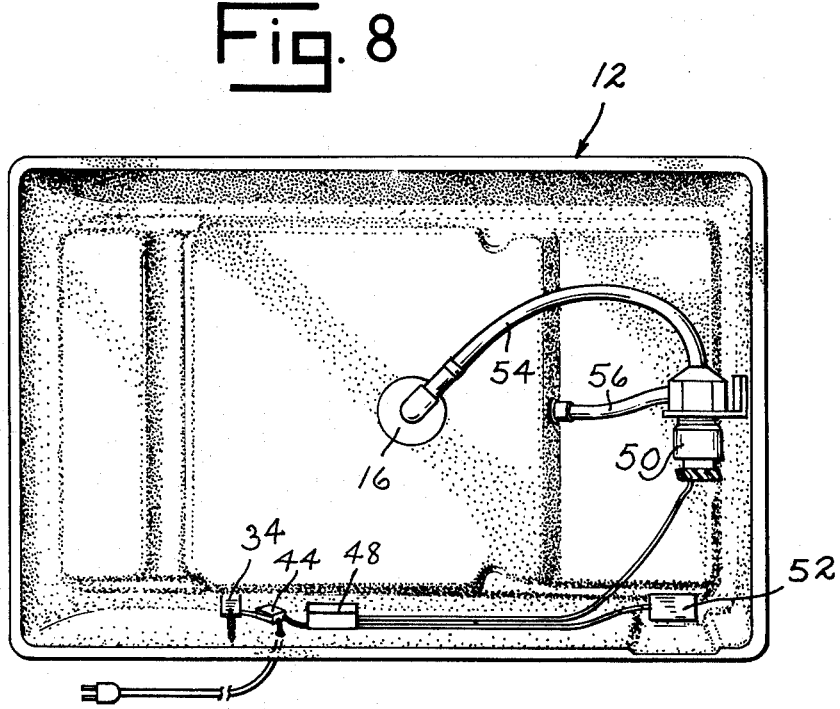

ANIMAL TOILET

BACKGROUND OF THE INVENTION

This invention relates to a toilet or waste disposal unit for a pet animal.

In many cities and in large apartment and condominium complexes there is a lack of sufficient ground area for a pet owner to use as bathroom facilities for his pet. Therefore in recent years there has been an effort made to produce toilets for pets which are adapted for use inside the apartment, condominium or house. Examples of such toilets are found in U.S. Pat. Nos. 3,227,138 and 3,793,988. The pet toilets depicted in such patents have certain construction characteristics which are not particularly desirable for extended toilet usage. In U.S. Pat. No. 3,227,138 no provision is made for the collection and disposal of solid excreta. In U.S. Pat. No. 3,793,988 the conveyor belt platform includes several parts including a switch which is susceptible to and in contact with urine and other liquid products formed during use or operation of the toilet. U.S. Pat. No. 3,227,138 also includes an exposed switch. Prolonged contact with liquiid of this nature could deleteriously affect the performance of the platform support parts and switches, requiring the toilets to be repaired. The following described invention presents an improvement over the aforementioned two patents and constitutes a simplified, reliable design for an animal or pet toilet.

SUMMARY OF THE INVENTION

The improved animal toilet of his invention includes a conveyor belt which is pivotally connected at one end to the housing of the toilet. The belt is designed so as to be selectively flexible, with the free end of the belt contacting and being supported by a trip switch. When the animal steps upon the belt, the belt is slightly depressed, causing the trip switch to be triggered. After the animal has deposited his excreta and has left the belt, the trip switch actuates a timer, which, after a predetermined period of time, activates a pump and drive motor for the purpose of rotating and cleaning the belt. The pivotal nature of the conveyor belt not only allows the trip switch to be actuated upon entry of the animal upon the belt but it also permits the belt to be fully raised to provide access to the toilet housing for purposes of cleaning the housing and replacing the cleansing fluid utilized to clean the belt. All liquid-susceptible electrical and mechanical components are located within the toilet housing so as not to be exposed to the cleansing liquid or excreta of the animal.

Accordingly, it is an object of the invention to provide an improved animal toilet which is of reliable operation.

Another object of the invention is to provide a waste disposal unit which is for pets and which may be easily maintained and cleaned.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 6 is a fragmentary inside view of the toilet housing as seen from line 6—6 of FIG. 4 showing the trip lever and its spring adjustment.

FIG. 7 is a fragmentary sectional view taken along line 7—7 of FIG. 5.

FIG. 8 is a bottom view of the toilet housing.

DESCRIPTION OF THE PREFERRED EMBODIMENT

Figure 1:
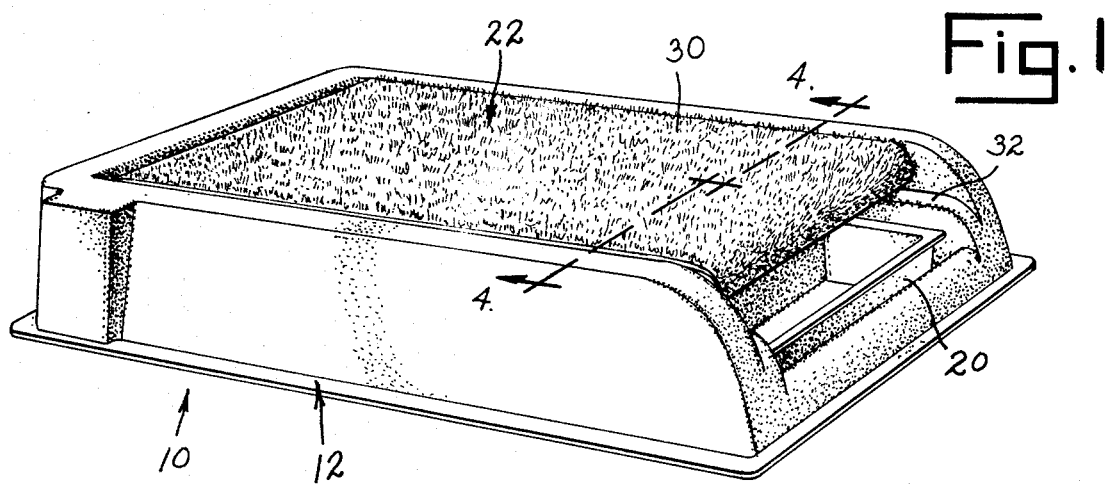
FIG. 1 is a perspective view of the toilet with its conveyor belt in its horizontal, usable position.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Toilet 10 illustrated in the figures includes a housing 12 having a receptacle area 14 which includes a drain 16. At one end of housing 12 next to receptacle area 14 is a trough area 18. A removable pan 20 fits within trough area 18. A conveyor 22 is mounted to housing 10. Conveyor 22 includes a central panel 24. Rollers 28 and 28' are connected by L-shaped brackets 26 to the ends of panel 24. An endless belt 30 extends about rollers 28 and 28' and over the top and bottom of panel 24. Belt 30 is preferably formed of an interwoven material having a grass-like appearance.

Conveyor 22 overlies receptacle area 14 and has one end pivotally connected to housing 12 at the opposite end of the housing from trough area 18. The pivoting of conveyor 22 to housing 12 is accomplished by providing roller 28 with coaxial pins 29 which are supported within the inner side walls 13 of the housing. The opposite or discharge end of conveyor 22 extends to trough area 18. Housing 12 is provided with a pair of shoulders 32 which are utilized to support the discharge end of conveyor 22.

A trip lever 34 protrudes through opening 36 in housing side wall 13 at one end of receptacle area 14 near trough area 18. Lever 34 extends into the interior of housing 12 and is there connected to one end of a helical spring 38 which in turn is connected at its oppostite end by an adjustment screw 40 and nut 41 to exterior side wall 15 of housing 12. Screw 40 fits within a slot 42 in housing side wall 15 and when loosened can be slid within the slot so as to vary the tension upon spring 38 and, in turn, vary the pressure required to trip or pivot lever 34. The free end of lever 34 which is seen protruding into receptacle area 14 of housing 12 is located approximately the same level as shoulders 32 of the housing.

Figure 4:
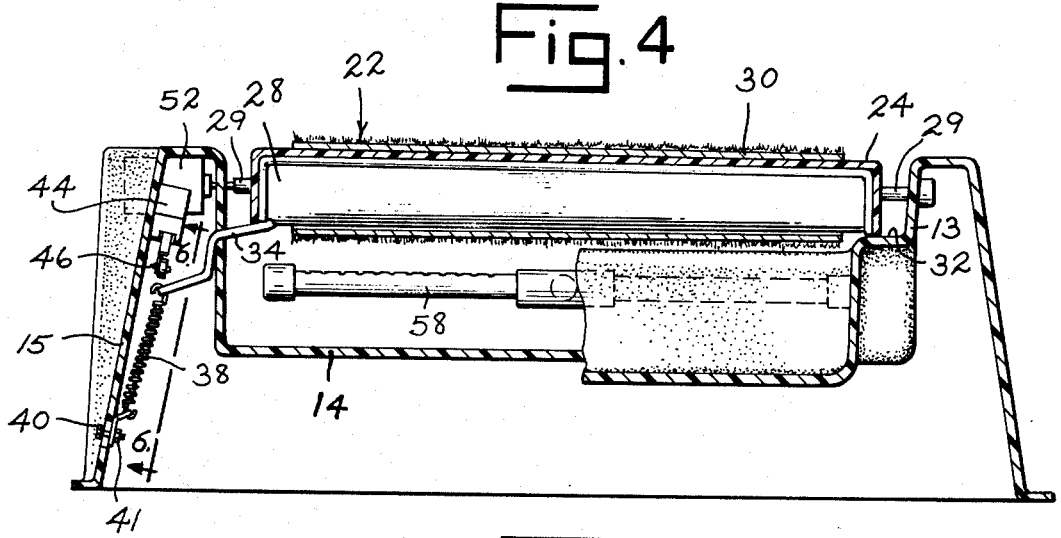
FIG. 4 is a sectional view taken along line 4—4 of FIG. 1 showing the belt supported by a trip lever in preparation for animal usage.
Figure 5:
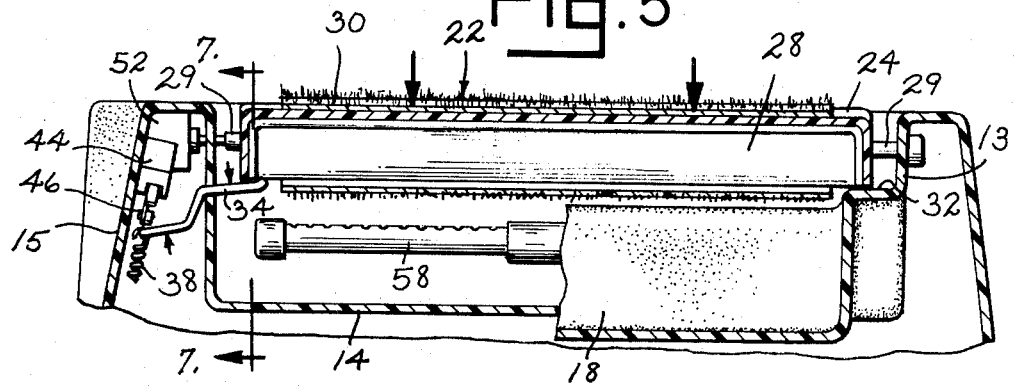
FIG. 5 is a section similar to FIG. 4 showing the trip lever depresed as the belt accommodates an animal.

In FIGS. 1 and 4 conveyor 22 is shown in a horizontal position with the discharge end of the conveyor being supported at one side of its panel 24 by adjacent housing shoulder 32 and at the opposite side of its panel by lever 34. Panel 24 is sufficiently flexible to allow a slight twisting of the conveyor at its discharge end. This twisting occurs about an axis which is generally perpendicular to the pivot axis of conveyor 22 through pins 29. This flexibility of panel 24, while sufficient to support the weight of an animal, permits one side of the discharge end of the conveyor to be supported by lever 32 in a slightly elevated position, as seen in FIG. 4, spaced above the underlying housing shoulder 32. When an animal steps upon conveyor 22 at the upper run of belt 30 the slightly raised corner of the discharge end of the conveyor will be forced downwardly causing lever 34 to be depressed, with conveyor panel 24 now being fully supported at both sides by housing shoulders 32, as shown in FIGS. 5 and 7.

Figure 2:
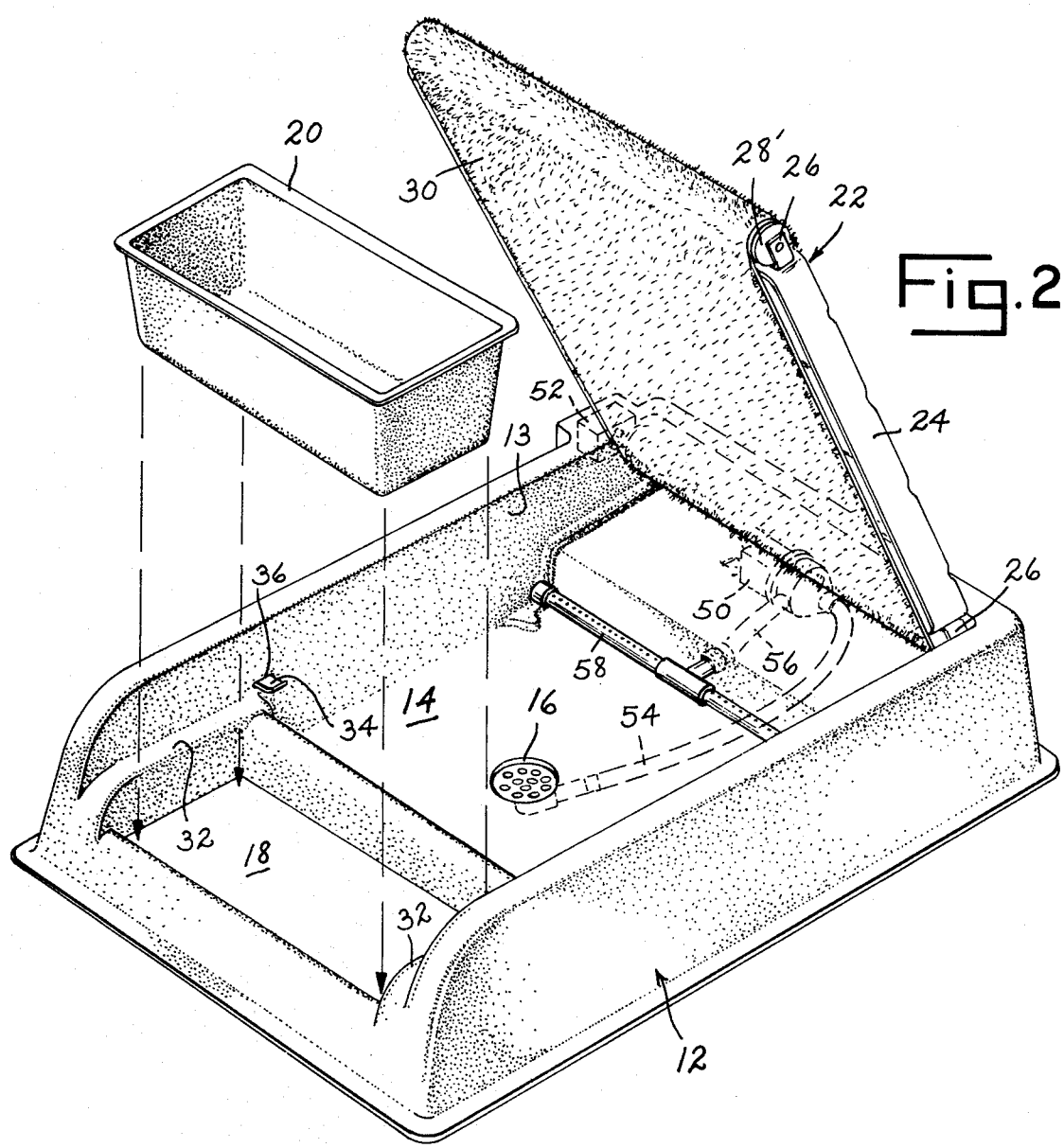
FIG. 2 is a perspective view of the toilet with its conveyor belt lifted and waste pan removed to provide access to the interior of the toilet housing.
Figure 3:
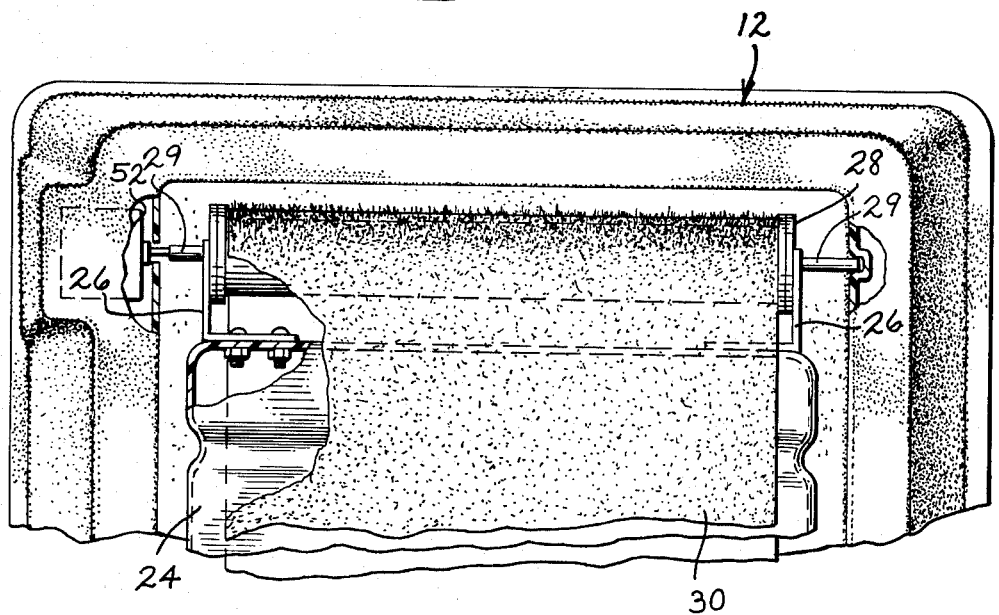
FIG. 3 is a detailed view of the pivot for the conveyor belt with portions of the housing and belt broken away for purposes of illustration.

A switch 44 is mounted interiorly of housing 12 next to the spring secured end of lever 34. Switch 44 includes a trip part 46, which, when lever 34 is pivoted under the weight of the animal standing upon conveyor 22, is contacted to place the switch in a ready position. After the animal completes its duties and leaves conveyor 22, spring 38 will cause lever 34 to be again pivoted, raising one side of the conveyor discharge end and releasing switch trip 46. Upon the release of switch trip 46, a timer 48 is activated. After a timed duration of several seconds to be certain the animal has completely cleared conveyor 22, a pump/motor 50 and a drive motor 52 are activated. Pump/motor 50 is connected by a conduit 54 to drain 16 in receptacle area 14 of the housing and by a conduit 56 to a T-shaped sprayer 58 located within receptacle area 14 under belt 30. A cleansing fluid, preferably also containing a deodrant, is held within receptacle area 14, which, upon activation of pump/motor 50, is forced out sprayer 58 and directed against the lower run of belt 30. Drive motor 52 is connected to one of the pivot pins 29 at the pivoted end of conveyor 22 and causes rotation of interconnected roller 28. Rotation of roller 28 in turn causes rotation of belt 30 about panel 24. Therefore, as switch 44 activates the timer 48 and the timer in turn after a selected period of time activates motors 50 and 52, belt 30 of conveyor 22 will be rotated and simultaneously cleaned with the solid excreta being deposited within pan 20 at the discharge end of the conveyor. After another selected period of time allowing cleaning of belt 30, timer 48 will deactivate the motors 50 and 52 with the conveyor now being ready for subsequent use by the animal. Electrical power for timer 48 and motors 50 and 52 is obtained from an electrical outlet. When it is desired to clean housing 12 or to remove pan 20, conveyor 22 may be pivoted into a generally upright position such as that shown in FIG. 2.

It is to be understood that when the embodiments of this invention are built-in to accommodate existing plumbing and sewage systems in an apartment, condominum or home, sprayer 58 will be connected directly to the water supply system of the housing unit with timer 48 serving either to activate a pump/motor or activate a valve which opens to allow pressurized water from the housing supply system to pass through sprayer 58. Also, drain 16 can be connected directly into the waste disposal system of the housing unit.

Further it is to be understood that the invention is not to be limited to the details above given but may be modified within the scope of the appended claims.

What we claim is:

1. An animal waste disposal unit which includes a housing having two side walls and a bottom wall defining a fluid collector; a conveyor including an endless belt supported between spaced rollers and having an upper run where the animal stands to deposit its excreta; said conveyor having a discharge end; the improvement comprising means connecting said conveyor at its opposite end from said discharge end thereof to said housing for pivotal movement of the conveyor relative to said housing over said fluid collector; means for rotating said belt; said belt having a lower run spaced from said upper belt run; spray means located within said fluid collector for directing fluid against said lower belt run to cleanse said belt; a trip lever means carried by said housing at the discharge end of said conveyor for contacting and yieldably supporting said conveyor discharge end in an elevated position; said trip lever means being yieldable into a depressed position when an animal steps upon said belt upper run to allow slight pivotal movement of said conveyor about its housing pivot connection means; switch means associated with said trip lever means for activating said belt rotating means and spray means; and receptacle means located at said conveyor discharge end for receiving any solid excreta carried upon said upper belt run as the belt is rotated.

2. The waste disposal unit of claim 1 wherein said conveyor includes a frame carrying spaced rollers; said housing side walls contacting and supporting said conveyor adjacent the discharge end thereof when said trip lever yields under the influence of an animal stepping upon said upper belt run.

3. The waste disposal unit of claim 2 wherein said trip lever means protrudes from one of said housing side walls, said conveyor frame being sufficiently flexible to allow twisting of said conveyor about an axis generally perpendicular to the axis of its pivot connection; said trip lever means normally supporting one side of said conveyor at its discharge end in said elevated position while said other conveyor side at the discharge end thereof rests upon the other of said housing side walls.

4. The waste disposal unit of claim 2 and adjustable spring means carried by said trip lever means for varying the amount of force required to urge said lever means into its depressed position.

* * * * *